US006461546B1

(12) United States Patent
Noid et al.

(10) Patent No.: US 6,461,546 B1
(45) Date of Patent: Oct. 8, 2002

(54) APPARATUS FOR AND METHOD OF PRODUCING MONODISPERSE SUBMICRON POLYMER POWDERS FROM SOLUTION

(75) Inventors: Donald W. Noid, Knoxville, TN (US); Joshua U. Otaigbe, Ames, IA (US); Michael D. Barnes, Oak Ridge; Bobby G. Sumpter, Knoxville, both of TN (US); Chung-Yi Kung, Tuscon, AZ (US)

(73) Assignees: UT-Battelle, Oak Ridge, TN (US); Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/559,714

(22) Filed: Apr. 26, 2000

Related U.S. Application Data

(62) Division of application No. 09/128,333, filed on Aug. 3, 1998, now abandoned.

(51) Int. Cl.[7] .................................................. B29B 9/10
(52) U.S. Cl. .......................................................... 264/9
(58) Field of Search ........................................ 264/9, 13

(56) References Cited

U.S. PATENT DOCUMENTS

| | | | | | |
|---|---|---|---|---|---|
| 3,933,955 | A | * | 1/1976 | Lysher | 264/13 |
| 4,302,166 | A | * | 11/1981 | Fulwyler et al. | 264/9 |
| 4,929,400 | A | * | 5/1990 | Rembaum et al. | 264/10 |
| 5,628,937 | A | * | 5/1997 | Oliver et al. | 159/4.4 |
| 5,720,985 | A | * | 2/1998 | Roche | 264/13 |

OTHER PUBLICATIONS

Gas Atomization of Polymers–II.Computational Neural Network Modeling published in Advances in Polymer Technology, by J.U. Otaigbe, D.W. Noid and Bobby Sumpter, vol. 17, No. 2, 161–173, 1998.

Molecular Dynamics Simulation of Polymer Flow in Nano–Channels published at Oak Ridge National Laboratory, Oak Ridge, TN by R.E. Tuzin, D.W. Noid, B.G. Sumpter and J.U. Otaigbe.

Atomise Polymers to Maximise Profits, published in Materials World by J.U. Otaigbe and J. McAvoy, Jul. 1997, pp. 383–385.

Gas Atomization of Polymers–I. Feasibility Studies and Process Development, published in Advances in Polymer Technology by J.U. Otaigbe and J.M. McAvoy, vol. 17, No. 2, 145–160, 1998.

A CCD Based Approach to High–precision size and Refractive Index Determination of Levitated Microdroplets using Fraunhofer Diffraction published Rev. Sci.Instrum. 68(6) by M.D. Barnes, N. Lermet, W.B. Whitten and J.M. Ramsey Jun., 1997.

Confinement and Manipulation of Individual Molecules in Attoliter Volumes, published in Analytical Chemistry, reprinted from vol. 70, No. 3, by C.Y. Kung, M.D. Barnes, N. Lermer, W.B. Whitten and J.M. Ramsey, pp. 658–661.

* cited by examiner

Primary Examiner—Mary Lynn Theisen
(74) Attorney, Agent, or Firm—J. Herbert O'Toole; Nexsen Pruet Jacobs & Pollard, LLC (57) ABSTRACT

This invention describes a method of producing polymer powders from solution in a compatible solvent using a new device referred to as a microdroplets on demand generator (MODG). The embodiment of this invention is the MODG apparatus and its relevance as a method to extensive application in materials science and technology. Proof of concept is demonstrated using poly(ethylene) glycol polymer microparticles generated with the MODG and captured in a microparticle levitation device.

5 Claims, 6 Drawing Sheets

Figure 3 Fraunhofer diffraction analysis of three different polyethylene glycol microparticles produced with the MDOG. Solid curves are Mie theoretical fits to experimental data (crosses). The refractive index, determined independently of size, was 1.460, in good agreement with the refractive index of bulk PEG in this molecular weight regime.

Experimental size distribution of glycerol droplets sampled from free-running stream using On-Demand Droplet Generator:
40 μm initial diameter droplets of 2% v/v glycerol-water solution were trapped in particle levitator (≈ 90% of the water evaporates). Sizes were measured by Fraunhofer diffraction with size uncertainty of ± 0.002 μm;
Relative standard deviation in size is 0.6%

FIG. 6

APPARATUS FOR AND METHOD OF PRODUCING MONODISPERSE SUBMICRON POLYMER POWDERS FROM SOLUTION

This application is a divisional of U.S. application Ser. No. 09/128,333, filed Aug. 3, 1998, now abandoned.

STATEMENT AS TO RIGHTS TO INVENTIONS MADE UNDER FEDERALLY SPONSORED RESEARCH AND DEVELOPMENT

The U.S. Government has rights in this invention pursuant to contract number DE-AC05-960R22464 between the Department of Energy and Lockheed Martin Energy Systems, Incorporated.

BACKGROUND OF THE INVENTION

The present invention relates generally to an apparatus for and method of producing polymer powders. Specifically, the present invention is directed to an apparatus for and method of producing monodisperse and submicron sized polymer powders from solution.

Polymer powders are crucial to a far reaching assortment of industrial applications. These applications specifically require polymer powders of ever smaller particle size and size dispersity. For example, polymer powders that embody these characteristics are especially useful for forming plastic particles into intricate shapes with precise dimensions. Other applications that would also benefit from these characteristics include polymer alloys, self-reinforced plastic and elastomeric composites, foams, paints and coatings, molecular sieves, membranes, thickeners and thinners of colloidal dispersions, new materials for efficient chromatography and chemical sensors (molecular imprinting), cost extenders for various adhesive formulations, drug delivery systems, free flowing powders to generate more precise objects from 3-D lithography, catalysts containing larger surface area, photoluminescent polymer dots, and artificial enzymes for biomimetics.

Currently, polymer powders are produced by cryogenic grinding of polymer pellets. However, this method severely limits the size and size dispersity of resulting particles. In some cases, even the smallest sized particles with lowest size dispersity produced by grinding methods are inadequate for intended applications. In fact, the best grinding methods known to Applicants produce powders with diameters no smaller than about 100 microns having extremely broad size dispersity. Moreover, grinding methods cannot be used to adequately form microparticles of polyethylene-based waxes.

Gas atomization processes (GAP) overcome several disadvantages inherent in grinding methods by enabling the mass-production of high quality spherical polymers that are not amenable to grinding because of their waxy properties, such as polyethylene glycol. These processes achieve this by using high pressure (approximately 7.6 $MNm^{-2}$) nitrogen gas and a specifically designed nozzle to atomize a molten stream of polymer into fine droplets which cool to form spherical polymer powders. A further description of the process is found in "Atomize Polymers to Maximize Profit," *Materials World*, vol. 5 no. 7 July (1997), hereby incorporated by reference. This method, however, produces particles no smaller than about 50 microns. Moreover, resulting powder particles are size disperse. Furthermore, GAPs do not work at ambient conditions, since using this method polymers can only be atomized under high pressure and at narrow temperature ranges, for example between about 190–220° C. for low molecular weight polymers.

In "Molecular Dynamics Simulation of Polymer Flow in Nano-Channels," Tuzen et al disclose spherical powders between 5 and 200 microns made by a gas atomization process. *Poly Preprints*, 76, p. 585 (1997). However, resulting powders here are severely limited in terms of size dispersity and are likewise not produced at ambient conditions.

Commercially available vibrating orifice aerosol generators utilize the application of constant pressure and high frequency (10–100 kHz) disturbance of the stream of solution to produce droplets. Typically the droplets so formed have high monodispersity (≈0.1%) but have a lower practical bound on droplet size of about 25 microns. This combined with the high droplet velocity (up to 10 meters per second) and high droplet repetition rate (equal to the nozzle frequency) cause significant difficulties in collecting dry polymer particles from the stream without clustering or coagulation of wet or semi-dry particles.

Clearly, there is room for improvement in the art.

SUMMARY OF THE INVENTION

Therefore, it is an object of the present invention to provide a method of and apparatus for producing submicron sized polymer powders.

It is a further object of the present invention to provide a method of and apparatus for producing polymer powders having a size dispersity of as low as about 0.1%.

It is a further object of the present invention to provide a method of and apparatus for producing a wide range of polymer powder sizes the variation of which can easily be controlled by simply altering feed polymer solution concentration and/or apparatus dimensions.

It is a further object of the present invention to provide a method of and apparatus for producing polymer powders at ambient conditions.

These and other objects are achieved in one aspect of the present invention by a method of producing polymer powders. The method comprises the steps of: providing a solution comprising one or more of a wide range of solid materials in a compatible solvent or blend thereof; and applying one or more pressure pulses to a containment vessel containing the solution with a piezoelectric transducer, all at ambient conditions. This results in the formation of aerosol drops which dry to form uniquely small and monodisperse powders.

These and other objects are achieved in a second aspect of the present invention by an apparatus for producing polymer powders. The apparatus comprises: a droplet generating component having a containment vessel for solution having a small orifice. The vessel is connected to a piezoelectric transducer which applies intermittent pressure pulses to the solution at a full range of pressures and temperatures including ambient conditions, thereby causing the ejection of very fine droplets from the vessel. The apparatus may be set to produce droplets resulting in powders having a wide range sizes, some even being monodisperse submicron particles.

These and other objects are achieved in a third aspect of the present invention by a composition comprising polymer powders. These powders have the characteristics of having arbitrary size ranging from about 50 nm to about 50 microns. They also have size dispersity between about 0.1% and 2%.

BRIEF DESCRIPTION OF THE DRAWINGS

FIG. 1 is a perspective view of an embodiment of the polymer microparticle generation apparatus. of the present invention absent its aluminum housing.

DETAILED DESCRIPTION OF THE PREFERRED EMBODIMENTS

In accordance with this invention it has been found that polymer powders having improved characteristics for a number of industrial applications are produced. Although the present invention was originally developed in order to produce polymer powders that can be used to form plastic particles into intricate shapes with precise dimensions, resulting powders are also useful for the manufacture of a number of other industrial products. These include polymer sieves, membranes, spray coatings, thickeners and thinners of colloidal dispersions, cost extenders for various elastomeric and thermosetting adhesive formulations, new materials for efficient chromatography and chemical sensors (molecular imprinting), free flowing powders to generate more precise objects from 3-D lithography, catalysts containing larger surface area, photoluminescent polymer dots, artificial enzymes for biomimetics, and drug delivery and catalyst systems.

Moreover, when mixed with other micro-sized particles these powders are useful for a number of other applications including the production of polymer alloys, self-reinforced plastics, and elastomeric composites. Resulting polymer powders can additionally be used to make foams by selective leaching and laser sintering of parts made from the composites and/or blends of the polymer powders with other compatible organic (e.g. polyethylenes) and inorganic (e.g. phosphates) materials.

Figure 1:
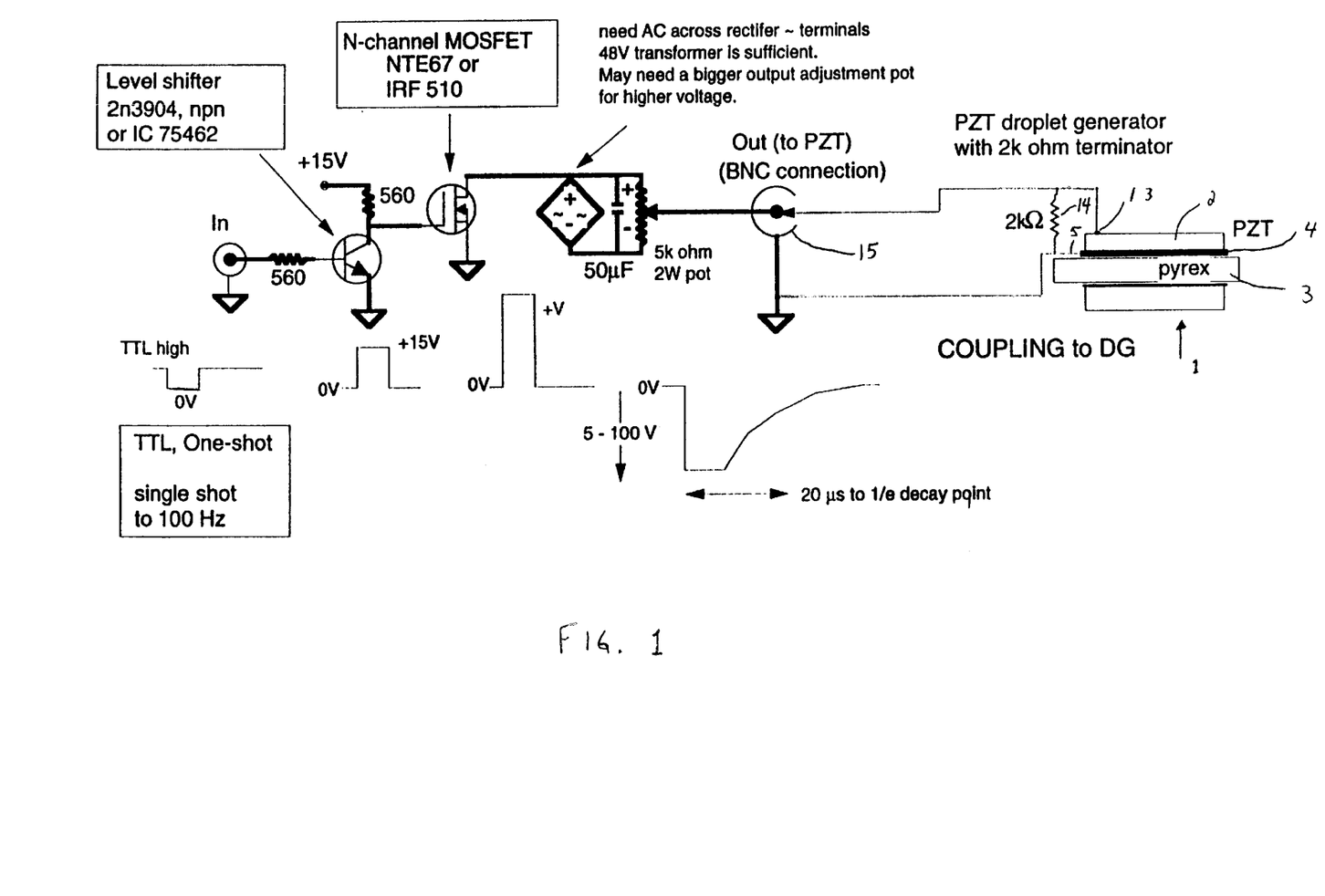
Figure 2:
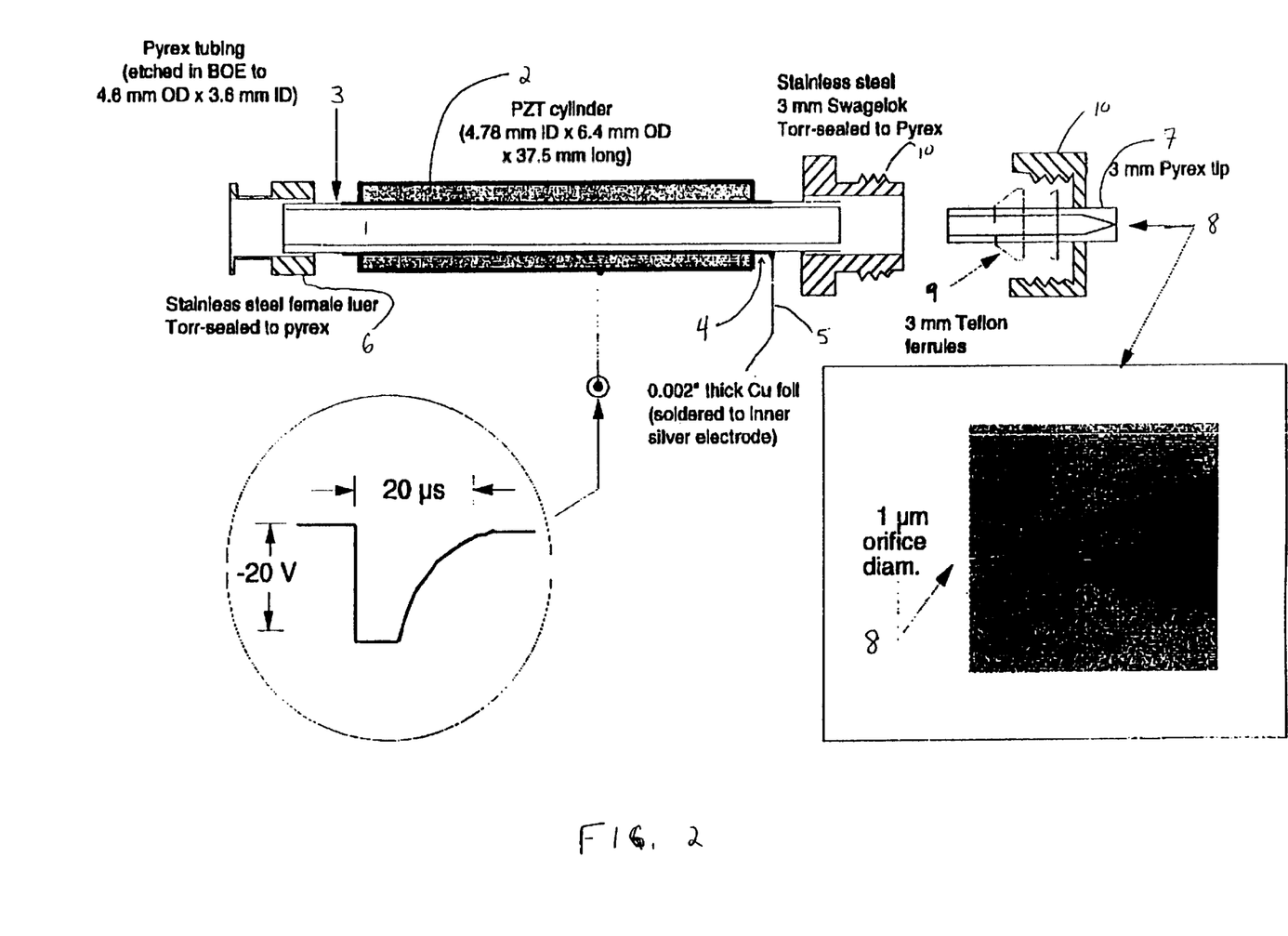
FIG. 2 is a cross-sectional view, in enlarged scale, of the droplet generating component of the polymer microparticle generation apparatus illustrated in FIG. 1.
Figure 3:
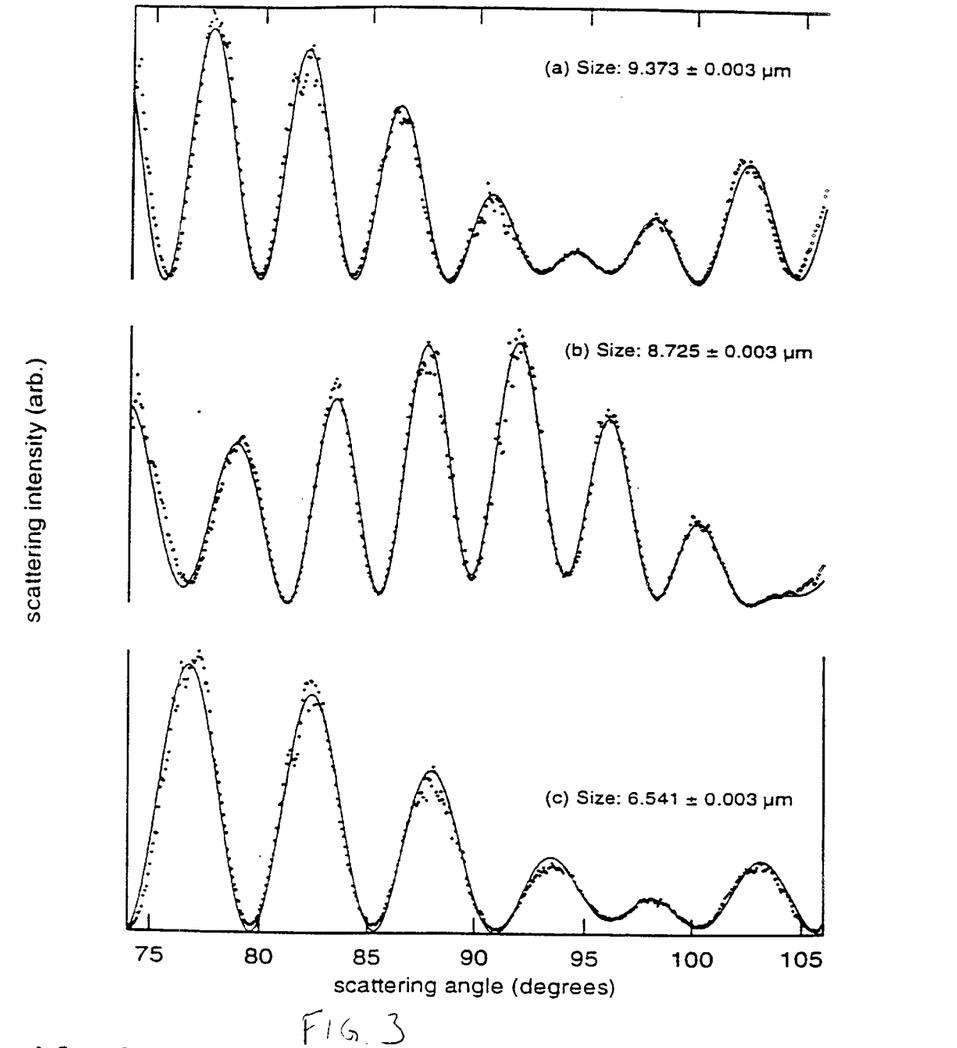
FIG. 3 is a graph of Fraunhofer diffraction analysis of three different polyethylene glycol (PEG) microparticles produced with the polymer microparticle generation apparatus illustrated in FIGS. 1 and 2.
Figure 4:
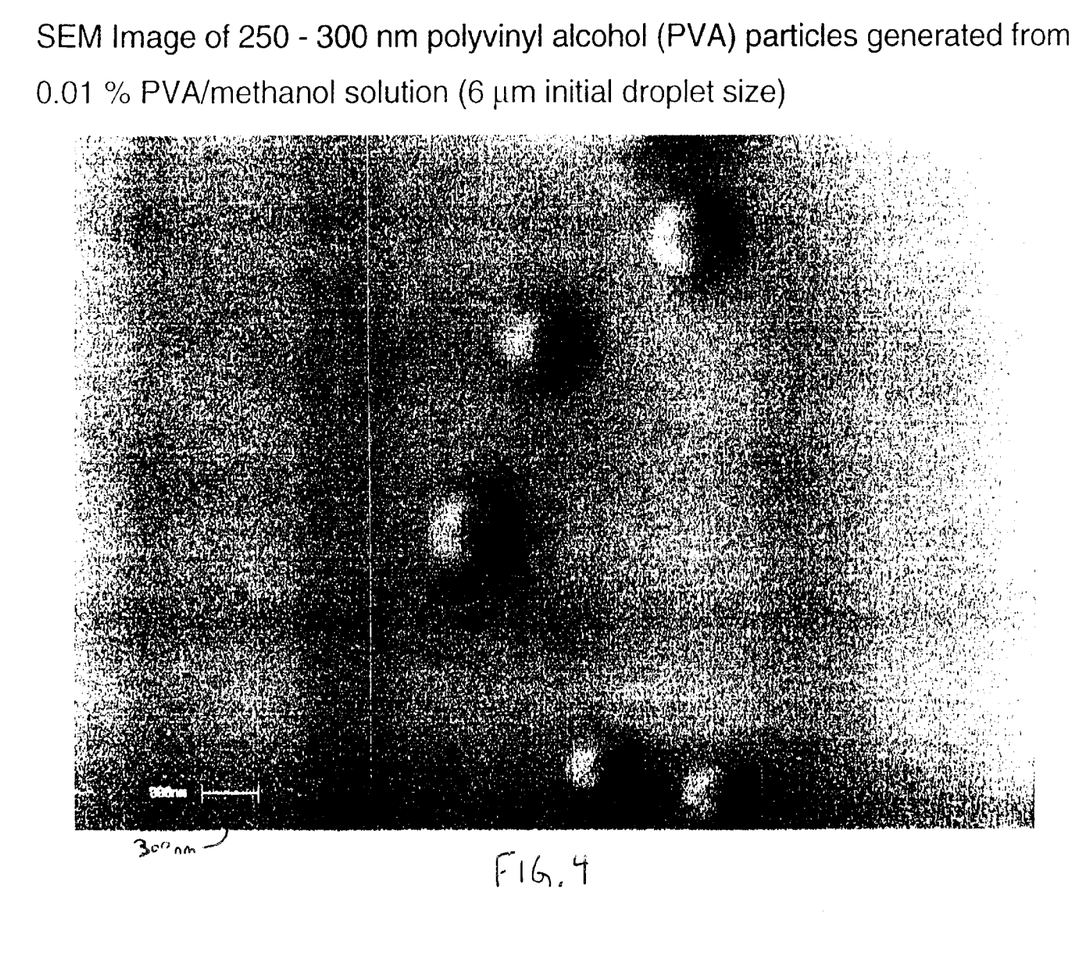
FIG. 4 is a scanning electron microscope image of ≈250 to ≈300 nanometer polyvinyl alcohol (PVA) particles generated ejection of 0.01% PVA/methanol solution droplets by using the apparatus illustrated in FIGS. 1 and 2.
Figure 5:
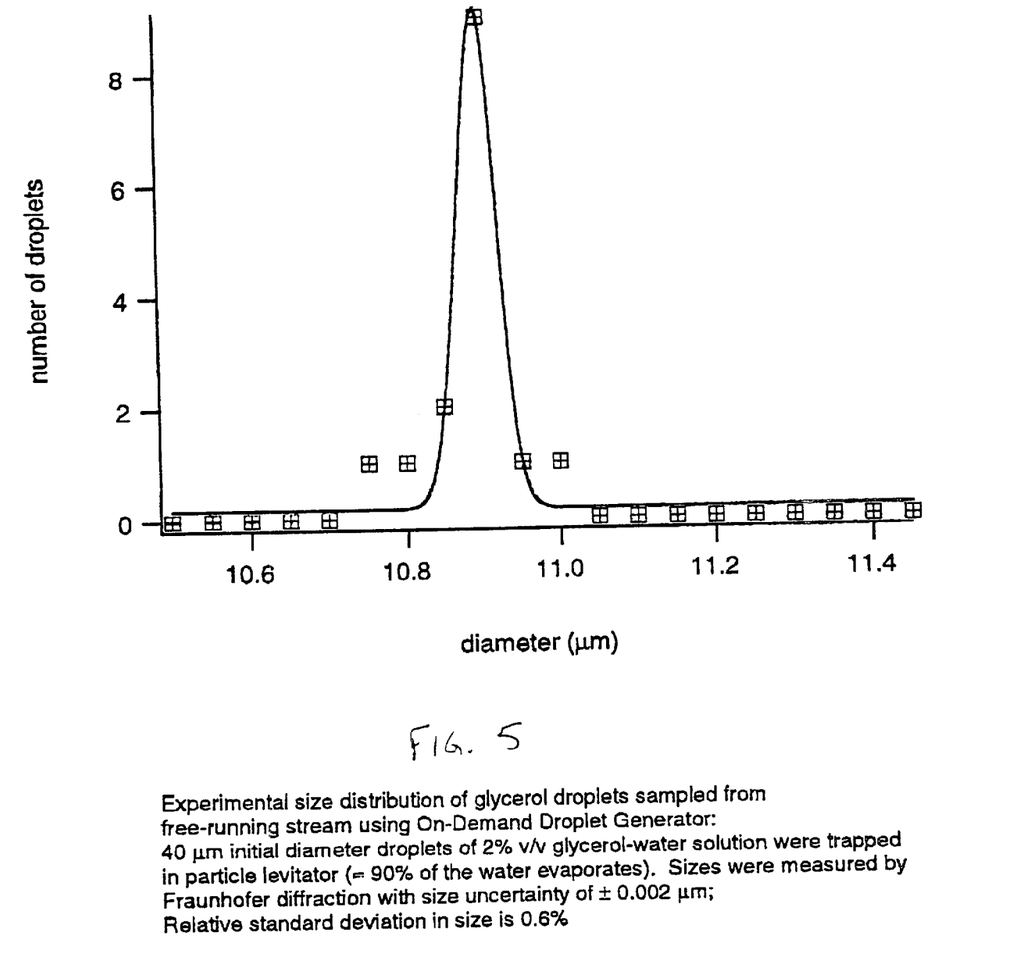
FIG. 5 is an experimental size distribution graph of glycerol droplets sampled from a free-running stream produced by the apparatus illustrated in FIGS. 1 and 2.
Figure 6:
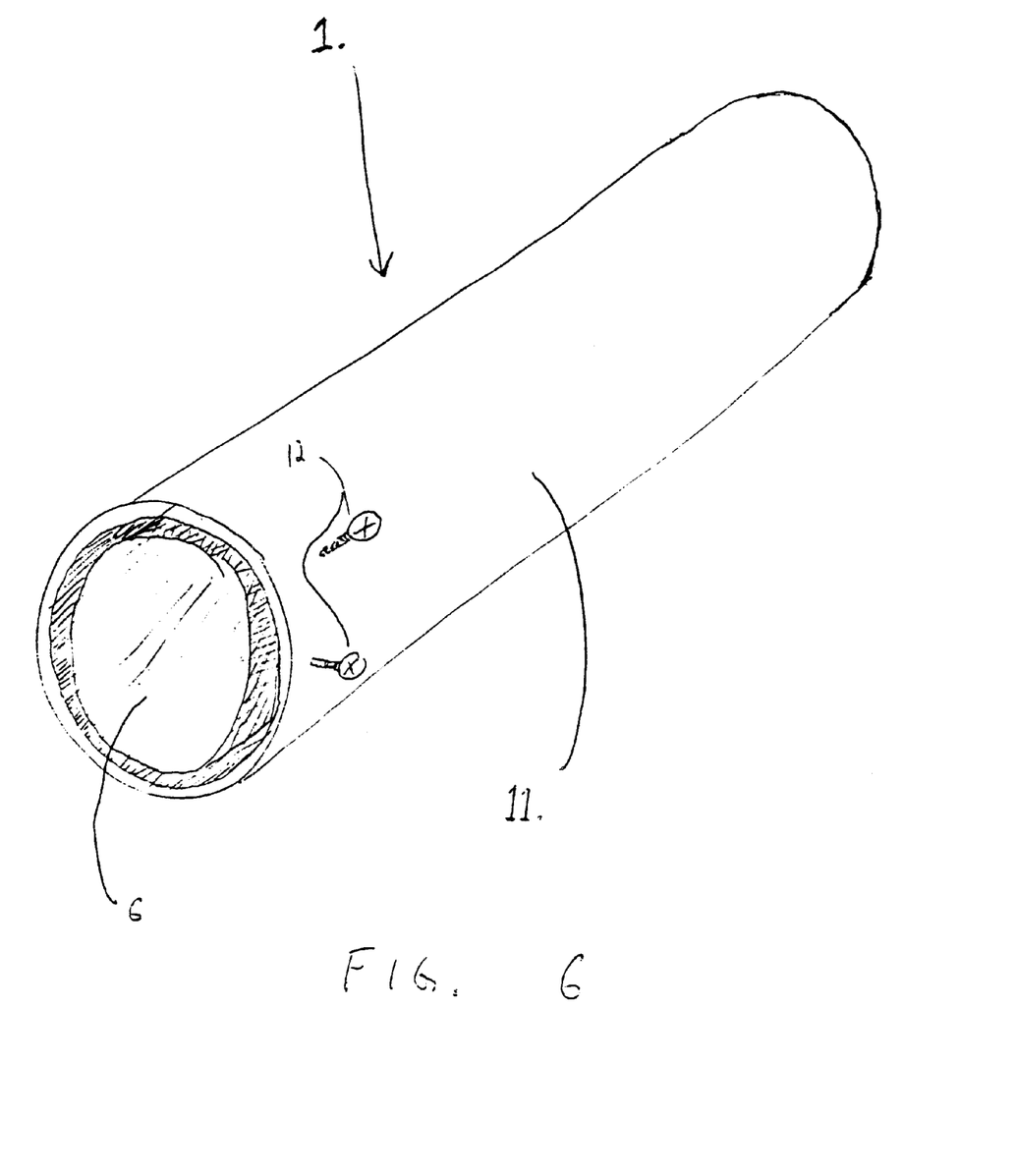
FIG. 6 is a perspective view of an embodiment of the polymer microparticle generation apparatus shown in FIGS. 1 and 2 covered by an aluminum housing.

To achieve this broad range of application, the present invention produces powders small enough to allow intimate mixing of powders with other particles at micrometer length scales not possible with current polymer powders. Hence, as distinguished from related methods and devices, the present invention specifically allows the production of polymer powders smaller than ever before possible. For example, the present invention includes a method and device for producing polymer powders with diameters as low as 0.250 microns. (See example 4, infra) Moreover, powders produced by the present invention have extremely low size dispersity. Depending on the size of particles produced, the apparatus shown in FIGS. 1 and 2 produces droplets of solution containing solvated polymers at a production rate of between about 20 to about 1000 Hz (in droplets per second). These droplets typically range in size from about 2 microns to about 200 microns. When dried the polymers form powders having particles sized between about 0.250 microns and about 200 microns with size dispersities from about 0.5% to about 2%. However, if not for limitations of available methods of sizing analysis, it is believed that the present invention is capable of producing near monodisperse powders sized even to the molecular level. It is believed that resulting particles are as small as 100 nanometers, and for some materials as small as 50 nanometers. Hence, the present invention can be used to produce particles with arbitrarily small size.

In the case of polymer powders having such small sizes, the particle size dispersity is determined by the number of polymer molecules which constitute the particle as governed by Poisson statistics. For example, if the average number of polymer molecules per particle is one, then the distribution of particle sizes (probability of a particle containing n molecules) is proportional to $1/[(2.303)(n!)]$, and the relative "standard deviation" would be the square root of 1, or 100%. This can be regarded as a lower bound on the limit of size and size dispersity for particles made using the present invention.

In the general case, however, where the number of polymer molecules in the particle is large (>100), the contribution to size dispersity from Poisson statistics is small, and the size dispersion will be dominated by the size dispersion in the initial droplet of solution.

Generally, the droplet generating device of the present invention comprises a solution containment vessel having at least one input opening and at least one output orifice having a diameter typically ranging from between about 1.0 to about 10.0 microns. The vessel is wrapped by a piezoelectric transducer which intermittently applies pressure pulses to the vessel's exterior. These pulses transmit through the vessel and propagate through the solution to cause droplet ejection.

Unlike related vibrating orifice aerosol generators which apply constant pressure causing a constant stream of outflowing solution, the present invention relies on the production of pressure waves. In vibrating orifice aerosol generators, or VOAGs, constant pressure is applied to solution to produce a high pressure stream of solution. A transducer applies intermittent pulses of pressure at or near radio frequencies which disturb solution flow rate. This breaks up the flow of the solution stream by periodic constriction of the orifice, thereby allowing production of droplets. However, this method has until now placed lower bounds on particle size.

By contrast, the present invention does not apply a constant external pressure upon the solution but relies solely on the application of repeated pulses of pressure applied to the solution vessel by a piezoelectric transducer itself (PZT). Solution rests in the vessel, subject to ambient pressure as in a reservoir. Pressure exerted by the transducer upon the vessel elastically transmits through the vessel to the solution. As a result, pressure waves internal to the solution vessel propagate through the solution to an outlet tip orifice. Thus, unlike VOAGs, the present invention does not subject the solution to a constant external pressure, thereby creating a constant outflow of solution. Rather, it uses waves of pressure from the PZT to actively eject portions of solution from the vessel. The PZT does not act to break up an already existing flow. Thus, the present invention may be characterized as working as a droplet ejection device. Used as such, the present invention quite surprisingly creates particles having size ranges much smaller than ever before possible which collectively result in monodisperse powders.

The present design also offers considerably higher coupling efficiency of the mechanical energy of the piezoelectric transducer (PZT) to the solution, which allows production of significantly smaller droplets than possible with any previously available devices. Using it, Applicants have produced stable droplet streams with each droplet having an initial diameter of between about 2–3 microns. At polymer concentrations of a few percent weight fraction, this capability allows production of nanometer-scale polymers powders with size dispersities of between about 1–2%.

The method and device of the present invention further offers a versatile configuration for producing a full range of larger polymer powders. By changing the size of the orifice and the concentration of the polymer feed solution, the size of particles is easily changed and controlled. This makes possible the production of a wide range of monodisperse polymer powders having desirable particle size and shape. In fact, a major advantage of this type of droplet production device for producing small polymer powders is that the droplet diameter is defined primarily by the orifice diameter, and not by other less easily controlled variables.

Finally, depending on its intended application, the device can operate at room temperature in an inexpensive low-power consuming manner, and in an unreactive controlled environment where biological polymers are not degraded. In fact, it works over a full range of temperatures and pressures, subject to state changes such as freezing of the solution or vaporization of the solution. Therefore, it is useful for breaking up biological structures without loss of biological activity due to intense pressures or temperatures. Of course this example is merely illustrative, since a number of other applications benefit from this general operating advantage.

Various components of the apparatus of the present invention may vary greatly depending upon specific applications. For example, the container vessel may be formed from any material capable of transferring pressure pulses from the transducer to the solution. A non-exhaustive list of such materials includes glass, stainless steel, plastics and other organic materials, other metals and other rigid solids. The vessel's orifice typically has a diameter of between about 1 and 10 microns, though this may also vary according to application.

Polymer powders and other particulate substances of the type disclosed herein are made by dissolving any number of high molecular weight polymers or other starting materials in most any solvent in which these materials are soluble. Possible starting materials are many and may include for example polymers, large molecular species, colloidal dispersions, enzymes and other biological structures, or mixtures thereof. In the same vein, compatible solvents are many and consist of single or blended solvents which lend sufficient solubility to respective solute material. It should be noted that solvents used also have relatively low vapor pressures to avoid cavitation effects; they also have relatively high surface tension.

In the preferred embodiment of the present method (FIG. 2), a voltage pulse or series of voltage pulses is supplied to a droplet generating component comprising a cylindrical piezoelectric transducer (PZT) and a copper foil which sheath a hollow temperature resistant glass tube having an outlet orifice. The foil is used as a shim between the glass tube and the PZT, thereby creating a snug fit. This ensures the required responsiveness of the tube to pressure pulses exerted by the PZT. The tube remains quiescent between pulse applications. The solution is passed through the droplet generating component and expelled therefrom through the orifice. Resulting aerosol droplets containing particles of starting material having reduced size are then dried, leaving monodisperse powders. A full discussion relating to drying solution phase powders can be found in the paper by M. D. Barnes et al, "A CCD based approach to high-precision size and refractive index determination of levitated microdroplets using Fraunhofer diffraction", *Review of Scientific Instruments*, 68, 2287 (1997), hereby incorporated by reference.

The preferred embodiment of the device of the present invention is constructed according to the following description. Now referring to the device as shown in FIGS. 1 and 2, the preferred embodiment of the droplet generator comprises a droplet generating component 1. It comprises a cylindrical piezoelectric transducer (PZT) 2 fitted around a thinned length of Pyrex® tubing 3 of approximately 2 mm in wall thickness. The Pyrex® tubing 3 has a length of about 2.13 inches with an internal diameter of about 0.14 inches and an external diameter of about 0.18 inches. Before construction of the device it was etched for smoothness in a 10:1 aqueous dilution of Buffered Oxides Etchant obtainable from the Transene chemical company. The transducer 2 is a cylindrical ceramic PZT model obtained from the Morgan-Matroc company. Tightly fitted between the Pyrex tubing 3 and PZT 2 is about a 0.002 inch thick cylinder of copper foil 4 to which is soldered to a silver electrode 5 through which voltage pulses are supplied.

Connected by a Torr-seal to one end of the Pyrex® tubing 3 is a stainless steal female luer 6. Connected to the other end of the Pyrex® tubing 3 is a 3 mm Pyrex® tip 7 having an orifice 8 of varying diameter. The tip is housed in a 3 mm Teflon® ferrule 9 which is Torr-sealed to the Pyrex® tubing 3 by a Swagelok® fitting 10 3 mm in diameter. The droplet generating component 1 is housed in, secured to and sealed to a 0.008 inch long aluminum cylinder 11 having a 0.5 inch internal diameter and a 0.675 inch outer diameter, by metal fittings 6,10 with screws 12 and sealed with silicon rubber (RTV), respectively. The aluminum cylinder 11 protects both the PZT 2 and the user from harm.

The silver electrode 5 soldered to the copper foil 4 supplies voltage pulses which vary in amplitude between about 5 and 200 volts. A bias electrical lead (which can alternately be connected to a ground or reference) is soldered to a connection strip 13 on the external cylindrical surface of the PZT 2. It leads to a 2 kΩ resistor 14 and then a floating R/C circuit reference 15.

Use of the preferred method of the present invention includes the device just described which is shown in FIGS. 1 and 2. Voltage pulse amplitudes are applied which range from about 5 to about 200 volts. Orifice diameters typically range from about 1.0 to about 10.0 microns. Corresponding voltage pulse amplitudes typically range from about 100 to about 5 volts, respectively.

Characteristics indicative of the particular PZT used include a piezoelectric relaxation rate of approximately 20 microseconds. Regeneration of pressure pulses was therefore limited to this time scale. What is more, given the exponential nature of the corresponding decay time required for PZT physical relaxation, in order to ensure complete relaxation between pulses for practical application of the device, frequency of applied pressure pulse was limited to about 1000 Hz. Hence droplet production rate is dependent upon a particular PZT's pulse decay time. Therefore, its decay time period constricted droplet generation practically speaking, to no more than about 1000 Hz. As a result, frequency of droplet generation runs at between about 10 and about 1000 Hz depending on corresponding time between pulses which is respectively set at between about 5 and about 50 microseconds.

Moreover, the preferred embodiment functions in one of two modes. In the first mode it functions as a one-shot on demand droplet generator whereby a single pulse causes a droplet ejection. Use in this mode requires application of a single voltage pulse of arbitrary frequency which is manually activated by a switch. The pulse induces a single pressure wave which causes the ejection of a small volume of aerosol polymer from the vessel. Here, pulse width (time) must be set long enough to send only one pulse between manual activation and deactivation. Results are dependent on pulse width and voltage amplitude. When used in the on demand mode, the apparatus shown in FIGS. 1 and 2 produced droplets of solution containing solvated polymers of between about 2 and about 25 microns in size with size dispersity of about 0.1–2%. In any case, to Applicants knowledge none of the powders produced using this mode have size dispersity greater than about 3%. Although resulting particles are more size disperse than those produced using the second mode described below, unlike related solution phase microparticle generation devices, the present invention allows for straightforward capture and extended characterization of individual polymer microparticles. This is useful for a full range of quality control and characterization applications.

In the second mode the preferred embodiment functions to produce a stable stream of droplets at arbitrary production/repetition rates up to 100–1000 Hz. Here, pulse width (time between pulses) was set at about 10 microseconds as seen in FIG. 1. This rate of droplet production was limited by the relaxation rate of the piezoelectric transducer. When used in the stable stream mode, the apparatus shown in FIGS. 1 and 2 produces droplets of solution containing solvated polymers of between about 2 and about 25 microns in size with size dispersity of about 0.6% to about 2% at a production rate of up to about 1000 Hz (in droplets per second). For an example of size distribution using this mode see example 5 and FIG. 5, infra.

This device generates much smaller drops than related VOAGs, (2–3 microns in initial diameter) albeit with some sacrifice in size dispersity (about 2% RSD is typical). An important consideration in the choice of droplet production mode for producing polymer particles is the solvent evaporation rate which is proportional to the square root of the droplet diameter. A discussion of this is disclosed by the Barnes et al paper, supra.

In many cases (for example in the formation of homogeneous polymer blends), it is important for the solvent to evaporate as quickly as possible. In general, this is desirable for almost any polymer powder production application since it helps to avoid coagulation of "wet" or semi-dry particles. Moreover, smaller droplets dry significantly faster.

Three comparative examples showing the versatility of the preferred embodiment in terms of particle size dependency on solution concentration are described below in Examples 1–3.

EXAMPLES 1–3

Three aqueous solutions of 1.0%, 2.5%, and 3.0% nominal weight fraction polyethylene glycol (PEG) having an average molecular weight of 10,000 grams/mole and obtained from Aldrich Chemical company were prepared. Hence, each solution had differing PEG polymer concentrations. All three solutions were separately fed into the device shown in FIG. 1, supra, thereby producing a droplet stream containing micropolymers at ambient conditions. Each of the three solutions were passed through an orifice having about a 30 micron diameter.

A sample of each of the three resulting droplet streams was separately captured in an electrodynamic levitation device made by Applicants and analyzed to determine the size of polymer particles contained within the droplets. This was accomplished through illumination of each of the three samples with a polarized laser which produced Fraunhofer diffraction patterns. These were then analyzed to extract size and infractive index information with a relative precision of about $10^{-4}$. The results are shown in FIG. 3.

FIG. 3 shows representative diffraction (or fringe) patterns for the three different nominal sizes produced according to analysis of the three samples. The resulting fringe patterns were analyzed by comparing calculations based on Mie theory which assumes that the particle is a perfect sphere. For more information on the general method used see, "A CCD-based approach to high precision size and refractive index determination of levitated microdroplets using Fraunhofer diffraction." *Review of Scientific Instruments*, vol. 68, 2287 (1997), and in "Confinement and manipulation of Individual Molecules in Attoliter Volumes," vol. 70, no. 3, pp. 658–661, both hereby incorporated by reference. The excellent agreement with Mie theoretical calculations indicate that the polymer microparticles produced in this way are indeed near-perfect spheres, and the refractive index (real part only) extracted from the diffraction pattern, 1.460, is in very good agreement with nominal values from bulk high molecular weight polyethylene glycol (PEG).

As seen in FIG. 3, resulting polymer particle sizes of the three examples of varying concentration and nozzle width, are 9.373, 8.725, and 6.541 microns each deviating ±0.003 microns.

EXAMPLE 4

Using the same device basic technique described in examples 1–3, 0.3 micron polyvinyl alcohol (PVA) polymer powders having a size dispersity of about 2% (RSD) were created at a production rate of about 20 Hz. However, in this case the orifice of the Pyrex® tip was about 6 microns in diameter, and a 0.01% fractional weight percent solution of PVA (90,000 MW) which can be obtained from Aldrich chemical company dissolved in methanol was used. Droplets of about 3 microns in diameter were produced and allowed to dry at ambient conditions to form a PVA polymer powder. A scanning electron microscopic image of resulting particles is shown in FIG. 4.

EXAMPLE 5

FIG. 5 shows an experimental size distribution of glycerol droplets sampled from the free-running stream mode of the device shown in FIGS. 1 and 2. Forty micron sized droplets of 2% volume ratio glycerol/water solution were trapped in a particle levitator and measured by Fraunhofer diffraction methods as described, supra. Particles had size uncertainty of ±0.002 microns. Size dispersity as measured by relative standard deviation of particle size was 06%.

Accordingly, it is seen that the present invention provides an apparatus for and method of producing submicron polymer powders having size dispersity ranging from about 0.1% for larger particles to about 2% for submicron particles. Moreover, the size and size dispersity of resulting powder may also be easily varied by altering orifice diameter and/or feed solution concentration, all available at a full range of pressure and temperature conditions. It will also be evident to one skilled in the art that other objects are met by the forgoing description.

It will be understood that various details of the invention may be changed without departing from the scope of the invention. Furthermore, the foregoing section description is for the purpose of illustration only, and not for the purpose of limitation since the invention is limited by the claims.

We claim:

1. A method for producing small sized particulate powders comprising the steps of:
    providing a solution comprising one or more of a wide range of solid materials or blends thereof in a non-volatile compatible solvent or blend thereof; and
    applying one or more pulses of pressure at an arbitrary frequency through said solution, to eject one or more droplets of said solution through a small orifice, said droplets containing particles which dry to a low dispersity powder.

2. The method according to claim 1 wherein said particles are sized between 0.050 microns and up.

3. The method of claim 2 wherein said particles have size dispersity less than about 3%.

4. The method of claim 1 wherein a containment vessel holds said solution, said pulse is created by a piezoelectric transducer applying intermittent pressures upon said containment vessel, said droplets containing particles which can be dried to monodisperse particles sized as small as about 0.250 microns.

5. The method of claim 4, wherein said particles have size dispersity less than about 3%.

* * * * *